(No Model.)

H. A. PARCELLS.
SHUFFLE HOE.

No. 543,266. Patented July 23, 1895.

Witnesses:
Sidney P. Hollingworth
K. H. Banks

Inventor:
Henry H. Parcells
by C. W. Neale
his atty

UNITED STATES PATENT OFFICE.

HENRY A. PARCELLS, OF DELTA, COLORADO.

SHUFFLE-HOE.

SPECIFICATION forming part of Letters Patent No. 543,266, dated July 23, 1895.

Application filed December 10, 1894. Serial No. 531,438. (No model.)

*To all whom it may concern:*

Be it known that I, HENRY A. PARCELLS, residing at Delta, in the county of Delta and State of Colorado, have invented certain new and useful Improvements in Shuffle-Hoes; and I do hereby declare the following to be a full, clear, and exact description of the invention, such as will enable others skilled in the art to which it appertains to make and use the same.

This invention relates to that class of gardening implements known as "shuffle-hoes." In implements of this class as heretofore constructed the side wings or guards rising from the ends of the working or cutting blade have been of a length at the most only equal to the width of the cutting-blade, and were open to the objection that in operation clods, lumps, or stones loosened by the action of the cutting-blade were free to fall or roll outside of the path of the cutting-blade and onto the young growing plants.

The object of the present invention is to avoid the objection above noted and to so improve the construction of such implements as to render them capable of a wider range of use.

With this object in view my invention consists in novel features of construction, which will be hereinafter described in detail, and then set forth in the claims at the close of this specification.

Figure 1:
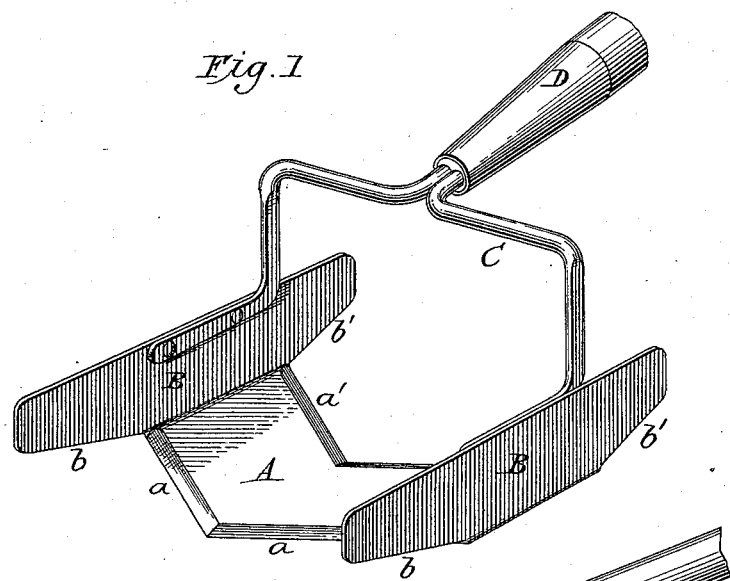
Figure 2:
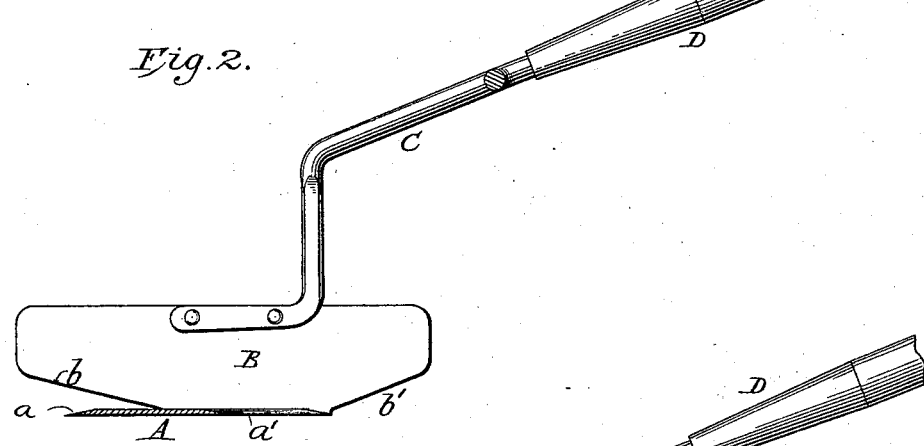
Figure 3:
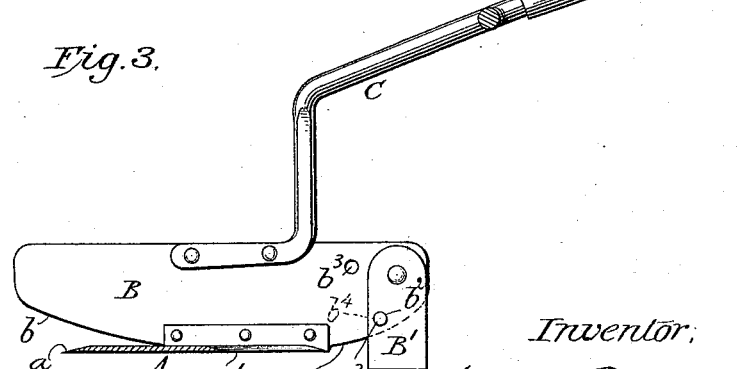

In the accompanying drawings, Figure 1 is a perspective view of a shuffle-hoe embodying my invention. Fig. 2 is a vertical section taken centrally through the cutting-blade. Fig. 3 is a similar view illustrating a slight modification of the side wings.

The implement as a whole is composed of a horizontal cutting or working blade A, side wings B, rising vertically, or practically so, from the ends thereof, and a divided or forked shank C, attached centrally to the end of a handle D and at its ends to the side wings or guards B.

The blade A is formed from a strip or blank of flat metal, preferably sheet-steel, and its upper surface is beveled at the front and rear edges to form cutting-edges $a$ and $a'$. As herein illustrated, said front and rear edges of the cutting-blade are shaped to incline rearward from the center to the ends, thus presenting the cutting-edges at an angle to the line of motion, so that roots or weeds encountered by the blade are severed by a shearing cut. This construction results in lessening the work of the operator and relieves the implement of such shocks as would tend to loosen its parts.

The side wings or guards B rise vertically, or practically so, from the ends of the cutting-blade A, and are preferably formed with the blade of a single piece of metal, thus avoiding joints, though the ends of the blade A may be provided with narrow upturned flanges, as indicated in Fig. 3, and the side wings be riveted thereto, without departing from the spirit of my invention. These wings B are extended to project in front and in rear of the front and rear edges of the cutting-blade, as shown, their lower edges $b$ and $b'$ being preferably inclined upward from a point in line with the edge of the cutting-blade to the end of said wings. This construction admits of the cutting-blade being inclined more or less from the horizontal in order that its advancing edge may enter to a greater or less depth beneath the surface of the ground without causing the edges of said wings to enter the ground.

It will be seen that as the wings or guards B are extended beyond each edge of the cutting-blade clods, stones, or loose dirt disturbed by the action of the blade will be prevented by said guards from falling to one side after the blade has passed, thus protecting young plants from injury from said clods or dirt. Moreover, the elongated or extended wings constitute guides to the eye of the operator, enabling him to operate the implement in a straight line and very close to a row of plants under cultivation without detriment to the latter.

In cultivating rows of ridged plants difficulty has been found in guiding such implements in a straight line, as their tendency is to slide or slip down the side of the ridge being worked. To avoid this difficulty I secure to one or both side wings, near the end, a guide-blade B', the lower end of which projects a short distance into the ground, and so holds the implement against side-slip. As illustrated, this guide-blade B' is pivoted at one point to the wing (or wings) B, near the rear end thereof, said blade being provided with a perforation $b^2$, designed to register with either one of two similar perforations $b^3$ and $b^4$, formed in the wing, whereby said blade may be adjusted on its pivot to project below the edge of the wing or be folded up against said wing, so as not to project below the edge thereof, the blade being secured in either position of adjustment by a pin or bolt $B^2$, passing through the perforations of the wing and blade. Other means familiar to mechanics may be employed to secure the blade in either position of adjustment without departing from the principle of this part of my invention, or said blade may be arranged to be conveniently attached or detached from the wing and to be applied to either end thereof and still remain within the scope of my invention.

Aside from its use for cultivating growing plants this implement will be found serviceable in trimming the edges of walks and in cutting sod, and to this end I contemplate sharpening the extended ends of the side wings B to a cutting-edge, as will be understood.

The shank C illustrated is composed of a length of rod doubled at its center to pass into the lower end of a handle D, the ends of said rod being spread apart and shaped to meet the side wings B of the implement near the upper edge and at points above the cutting-blade A, said ends being riveted to the side wings or secured in any other suitable manner to give strength and rigidity to the implement as a whole.

It will be understood that an implement of the character described, while designed with special reference to use as a hand implement, may be adapted for use with draft-animals by a mere change in the size and weight of the parts and by securing to the side wings or shank shackles or clips, to which trace-hooks may be attached. It will also be understood that, while I prefer to taper the bottom edges of the side wings upward, as described, either in straight or curved lines, as shown, this is not essential to the satisfactory operation of the implement, as said lower edges may be finished to stand in a plane with the under surface of the cutting-blade or may project downward below said plane for special uses to take the place of the guide-knife B'.

I claim—

1. A shuffle hoe comprising a horizontal cutting blade and an immovable side wing located at each end of the cutting blade and extended beyond the cutting edge thereof, the lower edges of said wings being flush with said cutting blade, substantially as described.

2. A shuffle hoe comprising a horizontal blade, and an immovable side wing at each end of and having their lower edges flush with said blade, the ends of said wings being extended beyond the front and rear edges of said cutting blade, substantially as described.

3. A shuffle hoe comprising a horizontal blade having cutting edges arranged diagonal to the line of operation, and side wings extended beyond the edge of the cutting blade, the lower edges of said wings being flush with said cutting blade substantially as described.

4. A shuffle hoe comprising a horizontal blade having cutting edges arranged diagonal to the line of operation, and side wings having their lower edges flush with the cutting blade and their ends extended beyond the front and rear edges of said cutting blade, substantially as described.

5. A shuffle hoe comprising a horizontal blade, side wings extended beyond the edge of the cutting blade, and a guide blade carried by the extended end of a wing, substantially as described.

6. A shuffle hoe comprising a horizontal cutting blade, side wings extended beyond the edges of said blade and a guide knife adjustably secured to an extended end of a wing, substantially as described.

7. A shuffle hoe comprising a horizontal cutting blade, side wings extended beyond the edges of said blade, and an adjustable guide knife secured to the extended end of a blade, substantially as described.

8. A shuffle hoe comprising a horizontal cutting blade, and an immovable side wing attached to each end of and extending beyond the edges of said cutting blade, the lower edges of said wings being tapered upward from a point in line with the edges of the cutting blade, substantially as described.

In testimony whereof I affix my signature in presence of two witnesses.

HENRY A. PARCELLS.

Witnesses:
C. V. ZINN,
CHAS. DUCHENEAU, Jr.